(12) United States Patent
Decker

(10) Patent No.: US 12,410,059 B2
(45) Date of Patent: Sep. 9, 2025

(54) PROCESS TO PRODUCE AN ENGINEERED CARBON

(71) Applicant: Earl R. Decker, Windsor (CA)

(72) Inventor: Earl R. Decker, Windsor (CA)

(73) Assignee: Bright Sand, Inc., Chattanooga, TN (US)

( * ) Notice: Subject to any disclaimer, the term of this patent is extended or adjusted under 35 U.S.C. 154(b) by 738 days.

(21) Appl. No.: 17/662,844

(22) Filed: May 10, 2022

(65) Prior Publication Data

US 2022/0348471 A1 Nov. 3, 2022

Related U.S. Application Data

(63) Continuation of application No. 16/296,976, filed on Mar. 8, 2019, now Pat. No. 11,325,834.

(60) Provisional application No. 62/640,755, filed on Mar. 9, 2018.

(51) Int. Cl.
| | | |
|---|---|---|
| C01B 32/318 | (2017.01) | |
| C01B 32/336 | (2017.01) | |
| C10B 49/02 | (2006.01) | |
| C10B 53/02 | (2006.01) | |

(52) U.S. Cl.
CPC .......... *C01B 32/318* (2017.08); *C01B 32/336* (2017.08); *C10B 53/02* (2013.01); *C01P 2006/12* (2013.01); *C01P 2006/17* (2013.01); *C01P 2006/82* (2013.01); *C10B 49/02* (2013.01)

(58) Field of Classification Search
CPC ..... C01B 32/318; C01B 32/336; C10B 53/02; C10B 49/02; C01P 2006/12; C01P 2006/17; C01P 2006/82; C01P 2004/51; C01P 2004/52; C01P 2006/14; C01P 2006/16; C09C 1/48; Y02E 50/10; Y02P 20/145

See application file for complete search history.

(56) References Cited

U.S. PATENT DOCUMENTS

| | | | |
|---|---|---|---|
| 6,808,390 B1 * | 10/2004 | Fung | ...... C01B 32/336 432/15 |
| 7,407,121 B2 | 8/2008 | Kerns et al. | |
| 8,715,582 B1 * | 5/2014 | Decker | ...... C01B 32/39 422/204 |
| 9,249,241 B2 | 2/2016 | Dai et al. | |
| 2012/0214000 A1 | 8/2012 | Kyrlidis et al. | |
| 2017/0058127 A1 | 3/2017 | Veettil | |
| 2017/0120219 A1 | 5/2017 | Diamond et al. | |
| 2018/0155552 A1 | 6/2018 | Spahr et al. | |

FOREIGN PATENT DOCUMENTS

| | | |
|---|---|---|
| WO | 2015109206 A1 | 7/2015 |
| WO | 2015168327 A1 | 11/2015 |
| WO | 2017205960 A1 | 12/2017 |

OTHER PUBLICATIONS

Tam, et al., Preparation of Activated Carbons form Macadamia Nut Shell and Coconut Shell by Air Activation, Ind. Eng. Chem. Res. 1999; 38: 4268-4276 (Year: 1999).*
International Search Report for counterpart application PCT/IB2019/000259 filed Mar. 9, 2018, mailed Jul. 16, 2019 (5 pages).
Tam, M.S., et al., Preparation of Activated Carbons from Macadamia Nut Shell and Coconut Shell by Air Activation, Ind. Eng. Chem. Res. 199, vol. 38, pp. 4268-4276.

* cited by examiner

*Primary Examiner* — Daniel C. McCracken
(74) *Attorney, Agent, or Firm* — Capitol City TechLaw, PLLC; Samuel P Burkholder

(57) ABSTRACT

A process for the conversion of hardwood and bamboo to engineered carbon is disclosed. The biomass feedstock of hardwood and bamboo is placed into a holding canister, and the holding canister is lowered into the sealable reactor vessel. The biomass feedstock is ignited, and superheated stream and/or water is metered, or alternately steam is created in situ by introduction of water, into the process. The process is controlled by supplying compressed air and steam, or in situ water, and releasing process gases. The process is performed in an oxygen deprived state. Steam, or in situ water, is injected at the end of the cycle to end the thermal conversion and clean the resulting engineered carbon.

12 Claims, 6 Drawing Sheets

FIG. 5 A

---------- Analysis Data ----------

Sample
  ID  2               Weight  0.2584g
  Description  eng2

Analysis
  Data ID  {52540188-fe59-4bd6-a5d9-3600221658ed}
  Operator  Earl Decker          Date  2018.05.07          Duration  625.483min
  Instrument  St 2 on NOVA touch 4LX [s/n:17016111501]     Firmware  1.02
  Comments
  Ambient Temp.  0°c          Void Volume Mode  He Measure       Cold Zone  3.81653ml
  Warm Zone  3.93411ml                Cell Type  9mm with rod    Thermal Delay  120sec
  Po Mode  Continuous

Adsorbate
  Name  Nitrogen             Molecular Weight  28.013g/mol     Cross Section Area  16.2Å²/mol
  Non-ideality  6.58e-005 1/torr   Bath Temperature  77.35k

Degas Information
  Time  0hours               Temp.  0°c

---------- Data Reduction Parameters ----------

Data Reduction Parameters
  Thermal Transpiration  no

DFT Method
  Model  N2 @ 77K on carbon (slit pore)(NLDFT Equ. model)
  Min P/Po  0             Max P/Po  1                    Moving pt. avg.  off

Adsorbate Model
  Name  Nitrogen            Molecular Weight  28.0134g     Cross Section Area  16.2Å²/molec
  Bath Temperature  77.35k ---------- DFT method Summary/Results ----------

Pore Volume  0.0854cc/g       Surface Area  212.7494m²/g   Lower Confidence Limit  0.7713nm
  Mode (Half Pore Width)  0.8440nm   Fitting Error  0.1590%                Notes  Desorption data (augm ---------- DFT method-Surface Area ----------

○ Area   ⊖ dS

[Plot: Cumulative Surface Area (cc/g) vs Half Pore Width (nm), with dS(r) (m²/nm/g) on right axis]

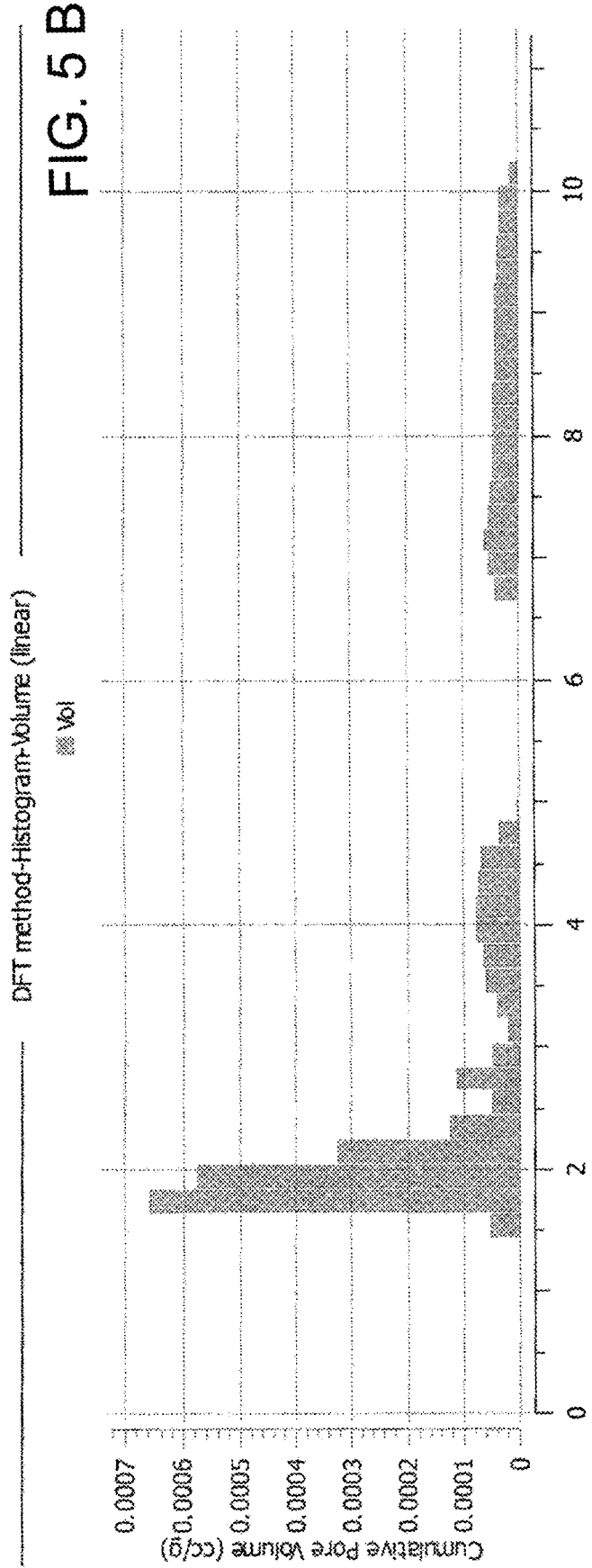

PROCESS TO PRODUCE AN ENGINEERED CARBON

CROSS-REFERENCE TO RELATED APPLICATIONS

The present application is a continuation application of U.S. patent application Ser. No. 16/296,976, filed Mar. 8, 2019, now U.S. Pat. No. 11,325,834 B2, granted May 10, 2022, which claims benefit from earlier filed U.S. Provisional Application No. 62/640,755, filed Mar. 9, 2018, the disclosures of all of which are hereby incorporated by reference in their its entireties for all purposes.

BACKGROUND

Field of Invention

The present disclosure relates to a process and equipment to produce an engineered carbon from raw biomass. The system process allows for the maximum amount of carbon to be retained, hydrocarbons to be driven from the biomass and the increased development of micro, meso and macro void fractioning throughout the engineered carbon while maintaining size and various other properties within a specific range of surface area.

Discussion of the Related Art

Today's multitude of high technology semiconductor devices each have at least one and usually several integrated circuits built from a chip of high purity silicon. Photolithographic processing of high purity silicon wafers can compress billions of transistors onto a fingernail size space. High purity silicon is required to produce these devices.

Silicon of 96-99% purity can be made by reducing either or both quartzite or sand with highly pure coke. This reduction process can be carried out in an electric arc furnace with an excess of $SiO_2$ present in the furnace to stop undesirable silicon carbide from being produced. The primary involved reactions are $SiO_2 + 2\ C \rightarrow Si + 2\ CO$ and $SiO_2 + 2\ SiC \rightarrow 3\ Si + 2\ CO$.

Hyperfine silicon, as typically used in wafers for integrated circuit and transistor production, can require impurity levels in crystalline silicon of less than 1 part per $10^{10}$, and in special cases impurity levels below 1 part per $10^{12}$ are needed and attained.

The production of silicon with purities of 96-99% is made by reducing quartzite or sand with highly pure coke or carbon. The process can be carried out in an electric arc furnace. Typically quartzite/sand is placed into an electric arc furnace together with a carbon source such as coal, coke, or charcoal and hardwood chips. The carbon sources and wood chips develop a reductive atmosphere, as well as producing available carbon, which allows the highly pure silicon metal to be produced by reduction of the silicon present in the quartzite/sand. The use of charcoal, particularly from renewable resources, has gained ground recently in an effort to develop a more sustainable source of feedstock. Another advantage of utilizing charcoal over coal is that charcoal usually has much lower levels of impurities, such as sulfur or mercury, thus reducing the need for extensive downstream equipment to remove the impurities from the exhaust stream.

Another use of activated carbon is in gas-vapor recovery processes where the activated carbon is desirable due to its high pore volume and surface area. Typically the particles of activated carbon used in a gas-vapor recovery process are generally smaller particles than the engineered carbon used in silicon metal production processes.

Another product is a biobased carbon black. Typically carbon black is made by the incomplete combustion of natural gas, kerosene, or oil during which carbon black is precipitated. Grinding engineered carbon to an average of 5 microns provides a carbon black with a greater hardness and structure desirable in higher grade carbon blacks. Sustainable carbon black, for example, carbon blacks recognized as USDA Bio Preferred, are one preferred form of carbon black.

The process of making charcoal has been performed for thousands of year without significant changes until the past few years. Currently many silicon plants are using charcoal produced from bee hive and or Missouri kilns. The resulting charcoal product has not changed significantly with similar physical characteristics and reaction properties as the charcoal produced over the millennia.

More recent developments have resulted in the discovery of new and unique forms of carbon, such as, graphene, single and multiple walled nanotubes, and nanospheres, to name just a few. Application of these new forms of engineered carbon to the production of silicon and in gas-vapor recovery systems is of interest to researchers.

SUMMARY OF THE DISCLOSURE

Engineered carbon for both the silicon manufacturing market and gas-vapor recovery systems, along with biobased carbon black, can be derived from specially prepared biomass feedstock, such as, hardwoods and bamboo. The presently disclosed process involves removing both free and bound water and hydrocarbons from the biomass, increasing the void fraction with a focus on the mesopores, maintaining a high fraction of carbon, and increasing the available interactions in the arc furnace used in silicon production. Developing the macropore structure while increasing the available surface area of the engineered carbon allows for the use of less biomass feedstock and an increase in silicon metal output and grade. The use of engineered carbon in the manufacturing of silicon will produce a higher purity silicon while also reducing downstream maintenance/emissions.

The engineered carbon as produced by the present process is typically much harder than regular charcoal. The increased hardness is believed to be due to the use of steam at above atmospheric pressure. This increased hardness can contribute to increased longevity of the carbon in both silicon metal production and gas-vapor recovery systems. Adsorption properties of the engineered carbon produced by the presently disclosed process are also believed to be enhanced due to the increase in pore structure.

The presently disclosed engineered carbon product can also be incorporated into a gas-vapor recovery system as the activated carbon in a vapor recovery unit. These vapor recovery units can vary from large industrial sized processors for recovery of organic components involved in the production or storage of numerous hydrocarbons like gasoline, diesel, jet fuel, alcohols, solvents and so forth, to smaller mobile units onboard vehicles powered by an internal combustion power plant, and can also include vapor recovery systems at locations for storage and distribution of hydrocarbon liquids and gases.

The presently disclosed process involves, among other items, at least two important elements specifically (1) the size and shape of the biomass feedstock, and (2) the porosity of the biomass feedstock.

The presently disclosed process includes cutting, sizing and shaping the biomass feedstock of hardwood or bamboo into specific dimensions. For hardwoods, pieces having lengths ranging from 4 to 36 inches, with the minor dimensions ranging from 1 to 6 inches are suitable for the presently disclosed process. Wedge shaped pieces originating from logs with diameters ranging up to 6 inches, and lengths of 4 to 36 inches are also acceptable. Slab wood, which is the outer bark-containing portion of a tree trunk or limb that has been squared off for further processing, originating from logs with diameters ranging up to 12 inches, and lengths of 4 to 36 inches are also acceptable.

For bamboo, either maintaining the original cylindrical shape, or cutting lengthwise in half provides a consistent post-treatment carbon product. The length of the bamboo feedstock should range from 3 or 4 inches to 36 inches, with the diameter preferably no greater than about 8 inches. Preferably bamboo stock with diameters larger than about 8 inches is cut in half lengthwise.

In the presently disclosed process, it is understood that porosity of the biomass feedstock is developed in two stages. The shape of the biomass feedstock is understood to impact porosity development. The first stage occurs during the removal of water, usually naturally occurring, from within the feedstock by using high temperature steam or dry air, typically 200 to 750 C at a pressure of 4 psi or greater, in combination with compressed air. The biomass feedstock can be either pre- or post-ignition. In the presently disclosed process, the biomass feedstock can be brought up to temperature (typically in a range of 200 to 750 C) quickly by steam developing inside the biomass feedstock. This steam is understood to open the pore structure and remove both water and hydrocarbons from the biomass feedstock. This stage of the reaction process can be sustained for 20 to 120 minutes, and is dependent on the amount of moisture initially present in the biomass feedstock.

In the second stage of the presently disclosed process, superheated steam and/or air can be metered into the reaction vessel, for example, by use of a solenoid injection system. Alternatively, a water injection or water misting system can be utilized to produce in situ steam. The superheated steam should have a temperature in the range of 450 to 500 C, at a pressure of at least 5 psi. The superheated steam can be produced at intervals to develop the macropore structure which can also increase the surface area of the carbon product to a range of 100 to 500 $m^2$/gram.

The presently disclosed method of converting a biomass feedstock into engineered carbon starts by providing a biomass feedstock having sizes and shapes within desired ranges, a holding canister and a sealable reactor vessel or autoclave. The biomass feedstock is placed into the holding canister, which is then placed into the sealable reactor vessel. The sealable reactor vessel is sealed and purged with air. A heater located at the bottom of the reactor vessel can be started in order to ignite and thermally convert the biomass feedstock. The heater used for this initial heating and water removal step can be fueled by a variety of fuel sources including diesel, biofuels natural gas, and syngas. After the thermal conversion process is well established, a mixture of superheated steam, which is generated or injected, and/or compressed air can be added into the reactor vessel. This addition of steam and/or air can be continued until the flue gas temperature reaches a desired first temperature, at which point the addition of the superheated steam and/or air is stopped. Both the temperature of the biomass feedstock and the pressure in the reactor vessel are allowed to increase until desired second levels are maintained. The thermal conversion of the biomass feedstock is also continued. The addition of compressed air is adjusted to maintain the pressure of the reactor vessel to a desired third level, usually above 20 psi, and up to 100 psi. The thermal conversion of the biomass feedstock is continued until its temperature reaches a desired third level at which point, high temperature steam or water is metered into the biomass feedstock which is understood to enhance extraction of hydrocarbons and increase the surface of the carbon product. Additional water can then be injected or added into the reactor vessel from the top of the reactor vessel to end the thermal conversion of the biomass feedstock, and clean the carbon product. Finally, the engineered carbon is recovered from the reactor vessel.

BRIEF DESCRIPTION OF THE DRAWINGS

The accompanying drawings, which are included to provide a further understanding of the invention and are incorporated in and constitute a part of this specification, illustrates preferred embodiments of the invention and together with the detailed description serve to explain the principles of the invention. In the drawings:

FIGS. 5A and 5B represent test data and histograms of the cumulative pore volume versus half pore width for one sample of engineered carbon according to the present disclosure.

DETAILED DESCRIPTION

Figure 1:
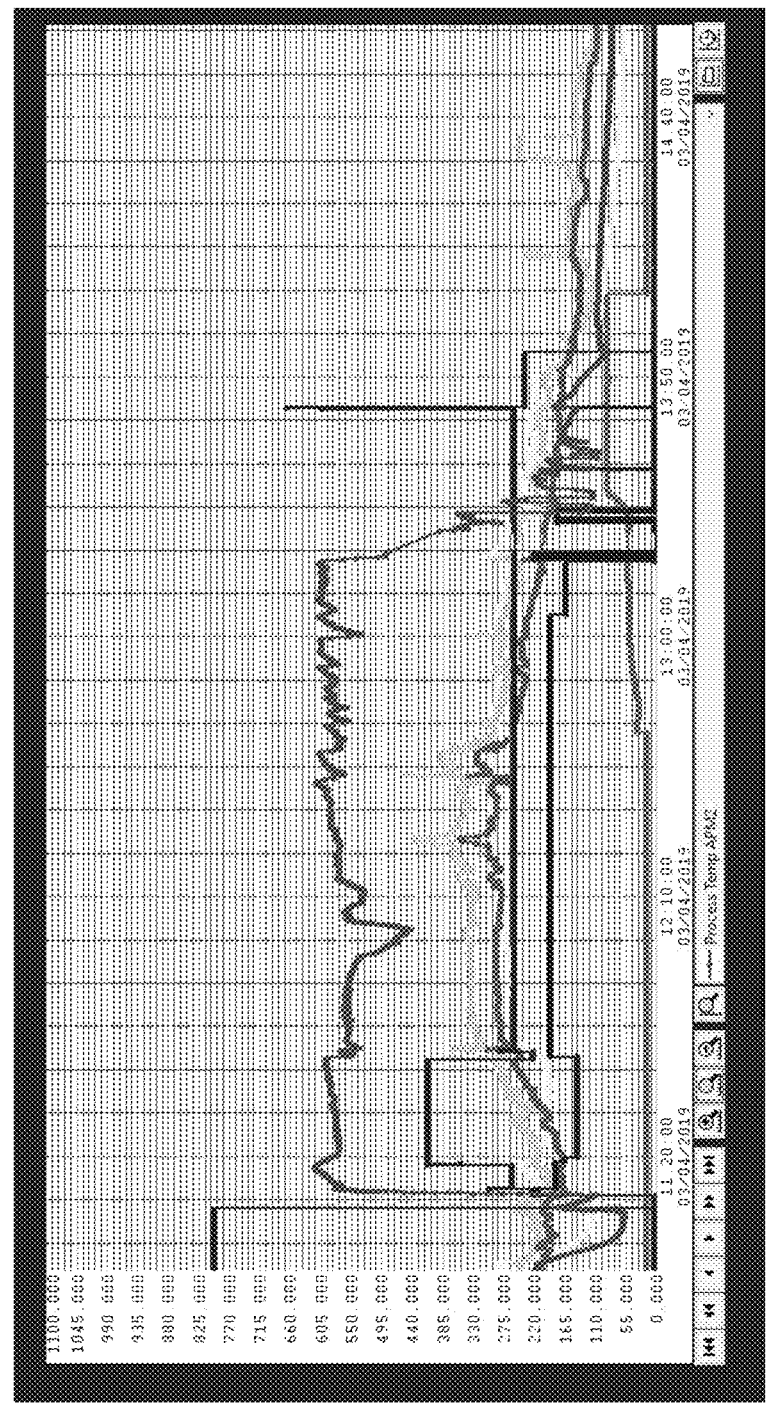
FIG. 1 is a screen capture of a process according to the present disclosure.

The presently disclosed method is directed to the development of an engineered carbon from hardwood and/or bamboo sources with a developed macropore (<50 nm) structure and high carbon retention. These features are understood to allow for increased interaction in the arc furnace process to convert quartzite to silicon metal.

The initial step of the presently disclosed method is to cut the hardwood and/or bamboo into specific dimensions. For hardwoods, pieces having lengths ranging from 4 to 36 inches, with the minor dimensions ranging from 1 to 6 inches are suitable for the presently disclosed process. For instance, roughly rectangular pieces with minor dimensions of 1 by 1 inch, 2 by 2 inch, 3 by 3 inch, 4 by 4 inch, 5 by 5 inch, and up to 6 by 6 inch with lengths from 4 to 36 inches would be suitable for the presently disclosed method. Wedge shaped pieces originating from logs with diameters ranging up to 6 inches, and lengths of 4 to 36 inches are also acceptable. Slab wood originating from logs with diameters ranging up to 12 inches, and lengths of 4 to 36 inches are also acceptable.

For bamboo, either maintaining the original natural cylindrical shape, or cutting lengthwise in half provides a consistent post-treatment carbon product. The length of the bamboo feedstock should range from 3 to 36 inches, with the diameter preferably no greater than about 8 inches. Bamboo with diameters larger than about 8 inches can be cut in half lengthwise prior to addition to the autoclave or sealable reactor.

Preferably, the hardwood utilized in the presently disclosed method is domestically sourced, and can include species such as, oak, ash, cherry, maple, hickory, eucalyptus and poplar. Domestic softwood varieties including cedar, fir, hemlock, pine, redwood and spruce, are preferably not used in the presently disclosed method, although can be used if necessary. Bamboo, which is now being grown commercially in the southern United States, can be used as the biomass and carbon source in the presently disclosed method.

The specially prepared biomass is then thermally treated to produce a char by thermally converting it in a holding canister inside an autoclave or sealable reactor vessel at pressure with an active and controlled flow of an atmosphere composed of compressed air and superheated steam.

High temperature steam and/or air, at either low or high pressure, can be metered into the reactor vessel at various stages in the presently disclosed process to develop and increase porosity of the biomass and the subsequent engineered carbon product.

In the presently disclosed process, it should be understood that when steam is called for in the process the steam can either be produced outside of the autoclave and metered into the autoclave/holding canister system, or alternatively, the steam can be produced in situ in the autoclave through the use of a water introducer, such as, a water atomizer or water misting system. The water introducer can be located inside the autoclave, or in some embodiments inside the holding canister, and can generate steam, including superheated steam, inside the autoclave by misting water onto the hot surfaces of the holding canister and/or the autoclave itself. Thus, the water misting system provides steam directly inside the autoclave.

Steam quenching the char product at the end of the presently disclosed process halts the thermal conversion of the biomass, and provides a clean engineered carbon product.

The presently disclosed process allows for the carbon prepared by this process to take on specific characteristics required in the manufacturing of high grade silicon.

Two important aspects of the presently disclosed process are the shape and size of the biomass feedstock and the porosity of the biomass feedstock. The porosity is understood to be affected by the treatment of the biomass feedstock during the presently disclosed process.

The sizing of the hardwood/bamboo raw material into specific lengths and sizes is understood to provide a consistent carbon product from this process. As discussed above, for hardwoods, pieces having minor dimensions ranging from 1 to 6 inches, or in wedge shapes that are no greater than 6 inches in diameter, and slab wood originating from logs with diameters ranging up to 12 inches are acceptable. In all cases, lengths of 4 to 36 inches are also acceptable. For bamboo, either maintaining the natural cylindrical shape, or cutting lengthwise in half provide a consistent post-treatment carbon product. The length of the bamboo feedstock should also range from 4 to 36 inches.

The shape of the biomass feedstock is also understood to contribute to the porosity developed during the presently disclosed process.

Porosity is developed in two stages. The first stage is during the removal of water from the biomass feedstock by treatment with high temperature air in the range of 100 to 750° C. at a pressure of 4 psi or greater in combination with compressed air. This treatment can be applied to biomass feedstock at either pre-ignition or post-ignition. The biomass feedstock can be brought to temperature which can include ranges of temperatures of 100 to 700° C., preferably 200° C. for hardwood, and another range of temperatures of 150 to 450° C., preferably 250° C. for bamboo, and quickly developing steam inside the biomass feedstock. This treatment step opens the pore structure of the hardwood/bamboo, and also removes water and hydrocarbons that are naturally present in the hardwood/bamboo feedstock. This process step can be sustained for 20 to 120 minutes, and depends on the initial characteristics and properties of the biomass feedstock, particularly the moisture level.

In the second stage of the porosity development treatment, steam can be metered directly into the biomass feedstock through a solenoid injection system, or in situ steam can be developed inside the reaction canister by the above-mentioned water misting system. The steam can be accompanied with the injection of additional air as needed. The pressure in the reaction canister can then be maintained at pressures ranging from 4 to 150 psi, and at temperatures ranging from 200 to 750° C. This steam treatment can be repeated at time intervals as needed to develop the macropore structure of the hardwood or bamboo feedstock, which in turn results in the engineered carbon product having a surface area ranging from 100 to 500 m$^2$/gram.

In one preferred embodiment of the presently disclosed method of converting a biomass feedstock into engineered carbon, the process commences with providing a biomass feedstock having sizes and shapes within desired ranges, providing a holding canister and a sealable reactor vessel, placing the biomass feedstock into the holding canister, and placing the holding canister into the sealable reactor vessel. The sealable reactor vessel is sealed, and purged with air, preferably in an updraft direction. A heater on the reactor vessel is used to ignite the biomass feedstock and it is allowed to begin thermal conversion. After thermal conversion of the biomass feedstock is confirmed by sensors, the process can be converted into downdraft operation.

Moisture can then be removed from the biomass feedstock by injecting a mixture of superheated steam and compressed air into the reactor vessel. This injection step also maintains an atmosphere that is low or deprived of oxygen. Once the flue gas temperature reaches a desired first temperature, for instance, in the range of 200° C., the injection of the superheated steam can be discontinued. As used herein, flue gas temperature refers to the temperature of the gas exiting the reactor vessel, in some instances, this gas may be referred to as the process gas. In some embodiments of the presently disclosed method, this injecting or addition step can be conducted in a downdraft direction.

The thermal conversion of the biomass continues, and results in both temperature of the biomass feedstock and the pressure in the reactor vessel increasing to desired second levels, for instance, biomass temperature in the range of 200 to 700° C., and in some instances, from 400 to 750° C., and reactor vessel pressure in a range of 0 to 200 psi, preferably about 100 psi.

The amount of compressed air is adjusted to maintain the pressure of the reactor vessel at a desired third level, for instance, in a range of 10 to 100 psi. The biomass feedstock continues to convert thermally during this adjustment of the compressed air. When the temperature of the biomass feedstock reaches a desired third level, as determined by the flue gas temperature, ranging from 300 to 800° C., high temperature steam with a temperature ranging from 200 to 750° C., and in some instances, from 400 to 750° C., can be metered into the biomass feedstock. It is understood that this metered high temperature steam and/or water enhances hydrocarbon extraction and increases the surface area of the biomass feedstock. The injection of steam can be accompanied with injection of air. This step of metering high temperature steam and/or water is also understood to increase water removal and the meso fractional void in the engineered carbon product.

The thermal conversion cycle can be ended by injecting water into the reactor vessel sufficient to end the thermal conversion of the biomass feedstock, and additional water can be used to clean and recover the engineered carbon product from the holding canister in the reactor vessel.

For the presently disclosed method, the sealable reactor vessel can have a heater attached, and ports for injection of steam, water, and air located at the top and bottom of the sealable reactor vessel. In some designs, the heater can be located at the bottom of the sealable reactor vessel. Additional design features can include the capability to have injection of compressed air in an updraft or downdraft direction, reverse flowing the off gas produced by the thermal conversion of the biomass feedstock back through the reactor vessel, and turning off the heater once the biomass feedstock has been ignited and thermal conversion sustained. Further capabilities can include addition of compressed air at constant or variable rates.

In another embodiment of the presently disclosed process, the holding canister can be loaded into a sealable reactor vessel and the biomass feedstock can be ignited utilizing hot gas, flame or other source of ignition plumbed into the bottom of the reactor vessel. Preferably, the reactor vessel is purged with compressed air prior to ignition. Once the biomass feedstock is ignited, the reactor vessel is preferably pressurized with compressed gas, preferably air, which is metered into the reactor vessel. The pressure within the reactor vessel is preferably 50 to 150 psi and more preferably 150 psi, but may be allowed to vary between 20 and 200 psi. The oxygen content within the reactor vessel can be at atmospheric levels or maintained at a concentration between zero percent oxygen and atmospheric level. The temperature at the most active point of carbonization within the reactor vessel is preferably at or above 250° C., more preferably at 400° C. to 900° C., more preferably at 600° C. to 850° C. and more preferably at 800 C to 850° C.

The presently disclosed process can be continued until a desired endpoint is reached. The desired endpoint may be, but is not limited to, the point at which the biomass feedstock is i) converted to carbon black, char or charcoal, or ii) reduced in mass to a level equal to approximately 25 to 35% or less of the original biomass feedstock mass. The biomass feedstock can then be quenched with steam. The remaining heat from the biomass feedstock superheats the steam to drive hydrocarbons off and activate the carbon. The holding canister is then removed from the reactor vessel and the activated carbon can be removed from the holding canister.

The presently disclosed process for the conversion of biomass feedstock to activated carbon can have reversible process flows, allowing gases to flow both upward and downward. In other words, the thermal conversion of the biomass feedstock can be in both downdraft and updraft directions. Likewise steam and/or air can be injected or generated in both directions, for instance, at the end of the carbonization process cycle to quench the carbonization and activate the carbon with an amount of steam within the range of 1-200 lbs. steam per minute per three tons original biomass feedstock. Preferably, the amount of steam for quenching and activation is within the range of 10-200 lbs. steam per three tons original biomass feedstock.

As defined by IUPAC and used herein, "micropore" refers to pores with width not exceeding about 2.0 nm, "mesopore" refers to pores of intermediate size between 2.0 nm and 50 nm, and "macropore" refers to pores with width exceeding about 50 nm.

A sealable reactor vessel suitable for use with the presently disclosed method can include the apparatus generally described in the applicant's prior patent, U.S. Pat. No. 8,715,582 B2, the disclosure of which is incorporated by reference herein in its entirety for all purposes.

Also disclosed herein is an engineered carbon derived from a biomass feedstock which has sizes and shapes within desired ranges, and the resulting engineered carbon has a macropore structure of less than 50 nm, a surface area ranging from 100 to 500 $m^2/g$, fixed carbon content on a dry fixed basis ranging from 81% to 95% by weight, ash concentration on a dry fixed basis ranging from 3.5% to 0.5% by weight, moisture content ranging from 2% to 8% by weight, and size distribution of 0% greater than 12 inches and maximum of 3% below 0.25 inches size.

Preferably, the majority of the engineered carbon is sized between about 0.75 inches and about 6 inches, with no dimension larger than 12 inches. In some embodiments of the present teachings, the engineered carbon can have a surface area ranging from 200 to 300 $m^2/g$, or from 100 to 400 $m^2/g$.

The presently disclosed engineered carbon can preferably have fixed carbon content on a dry fixed basis of at least 81% by weight, ash concentration on a dry fixed basis of 2% by weight, moisture content of 5% by weight, and a size distribution of 1.5% below ¼" size.

Additionally, in the final engineered carbon product, no visible green wood, or un-combusted wood should be present. No other foreign material should also be included with the final engineered carbon product.

In one embodiment of the present teachings, the engineered carbon produced by the present process can be further processed by grinding to form a carbon black material. The initial size of the engineered carbon material can be from a small size of 0.0625 to 0.75 inch with a high end of about 6 inches. This engineered material can then be ground or milled to an average particle size of about 5 microns.

In yet another embodiment of the present teachings, the engineered carbon produced by the present process can be further processed to form a carbon material suitable for vapor recovery applications. The initial size of the engineered carbon material can range from between about 0.0625 to 0.75 inch. This engineered material can then be sized to an average particle size of about 5 microns.

A screenshot of a typical processing run according to the present teachings is illustrated in FIG. 1. On the graph, pink, yellow and bright green are temperatures measured at the bottom, dome, and middle of the autoclave, respectively. These temperatures are measured in between the reactor wall and the vessel wall. The lowest lighter aqua line is a malfunctioning pressure sensor. The red line records the temperature of the process gas exiting the autoclave. Blue and dark green lines are the valve percent open for valves controlling the addition of the compressed air and process line exiting the autoclave, respectively.

Steam is first introduced into the reactor vessel at about 11:57, while the addition of compressed air is adjusted at about 13:04. The addition of water to end the thermal conversion occurs at about 13:14, just after the process gas temperature reached the desired level. The data for this processing run is submitted as supplemental material.

Figure 2:
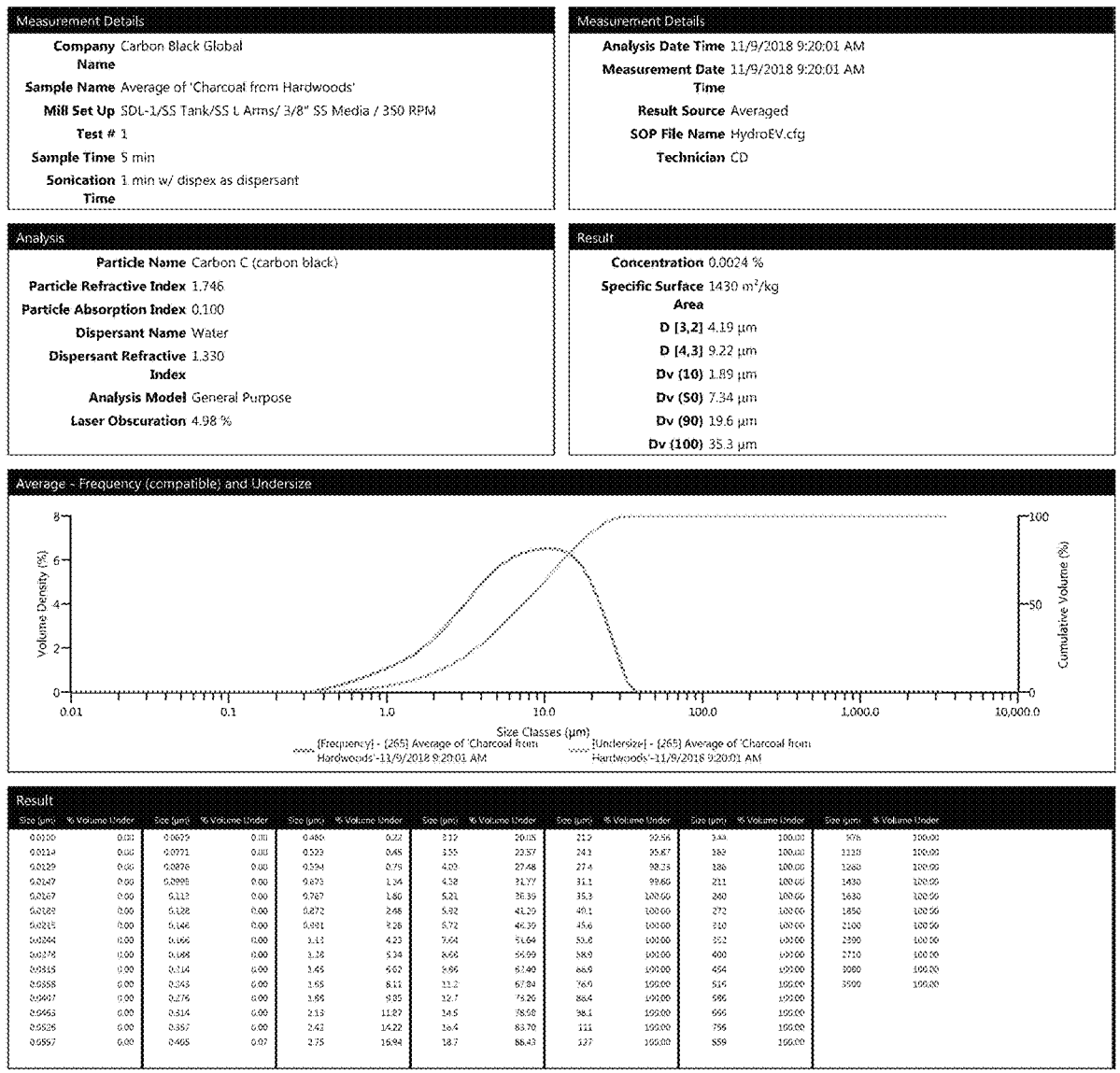
FIGS. 2 and 3 are particle size analysis reports of engineered carbons according to the present disclosure.

FIG. 2 presents particle size analysis on a sample of USDA Bio Preferred carbon black produced using the presently disclosed process with hardwood as the carbon source. The engineered carbon from the presently disclosed process was ground for five minutes with stainless media. The properties of the material were then analyzed, and the results are presented in FIG. 2. The specific surface area was measured at 1430 m$^2$/kg, and the $D_{50}$ and $D_{100}$ were 7.34 μm and 35.3 μm, respectively.

Figure 3:
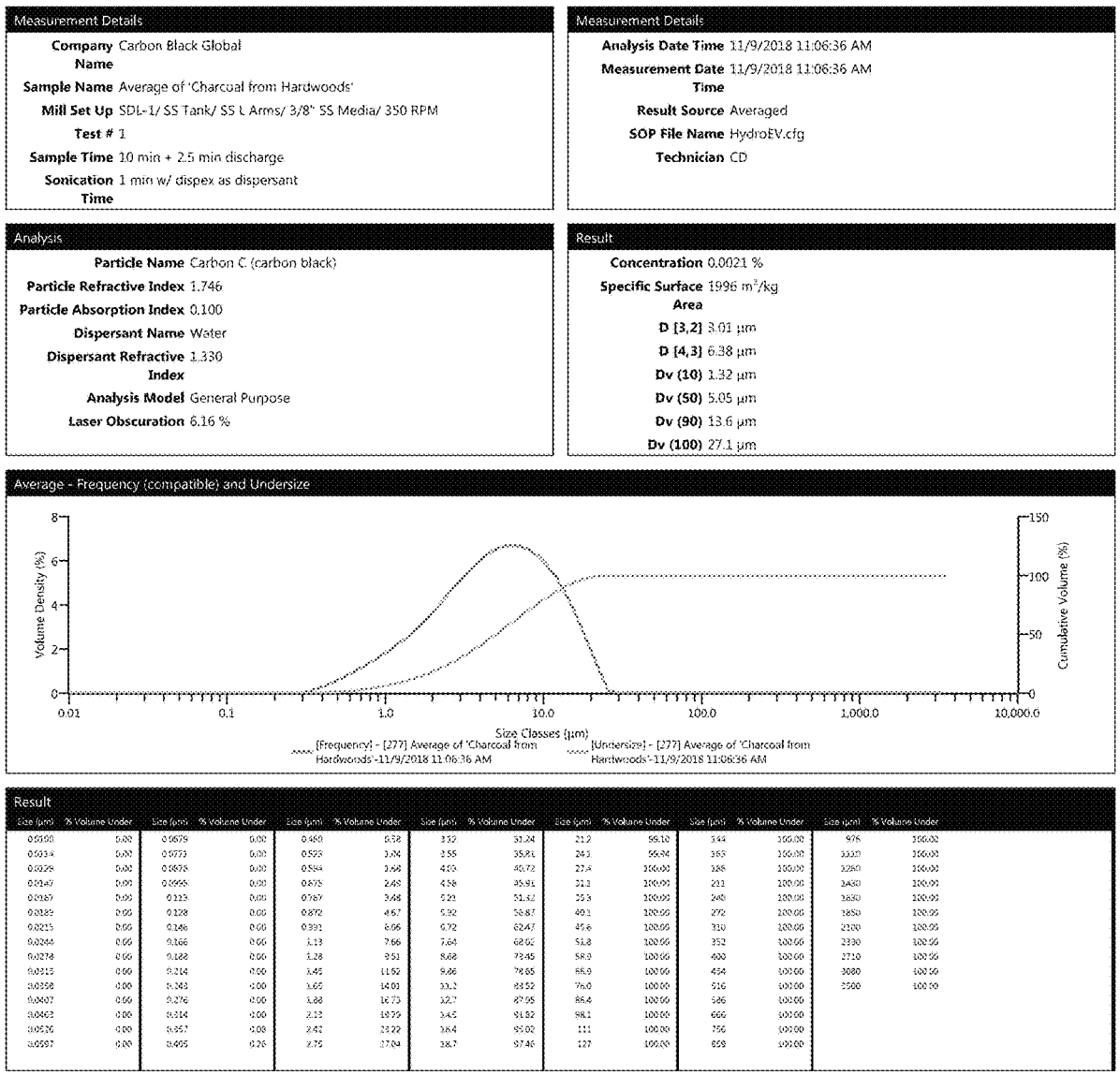

FIG. 3 presents particle size analysis on a sample of USDA Bio Preferred carbon black produced using the presently disclosed process with hardwood as the carbon source. The engineered carbon from the presently disclosed process was ground for ten minutes with stainless media. The properties of the material were then analyzed, and the results are presented in FIG. 3. The specific surface area was measured at 1996 m$^2$/kg, and the $D_{50}$ and $D_{100}$ were 5.05 μm and 27.1 μm, respectively.

All publications, articles, papers, patents, patent publications, and other references cited herein are hereby incorporated by reference herein in their entireties for all purposes.

Although the foregoing description is directed to the preferred embodiments of the present teachings, it is noted that other variations and modifications will be apparent to those skilled in the art, and which may be made without departing from the spirit or scope of the present teachings.

EXPERIMENTAL

Example 1

Figure 4A:
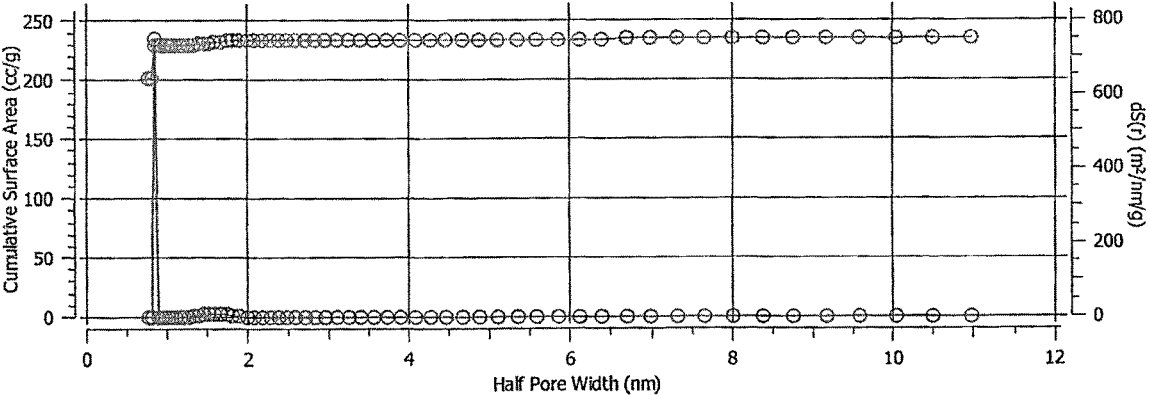
FIGS. 4A and 4B are test data and histograms of the cumulative pore volume versus half pore width for one sample of engineered carbon according to the present disclosure.
Figure 4B:
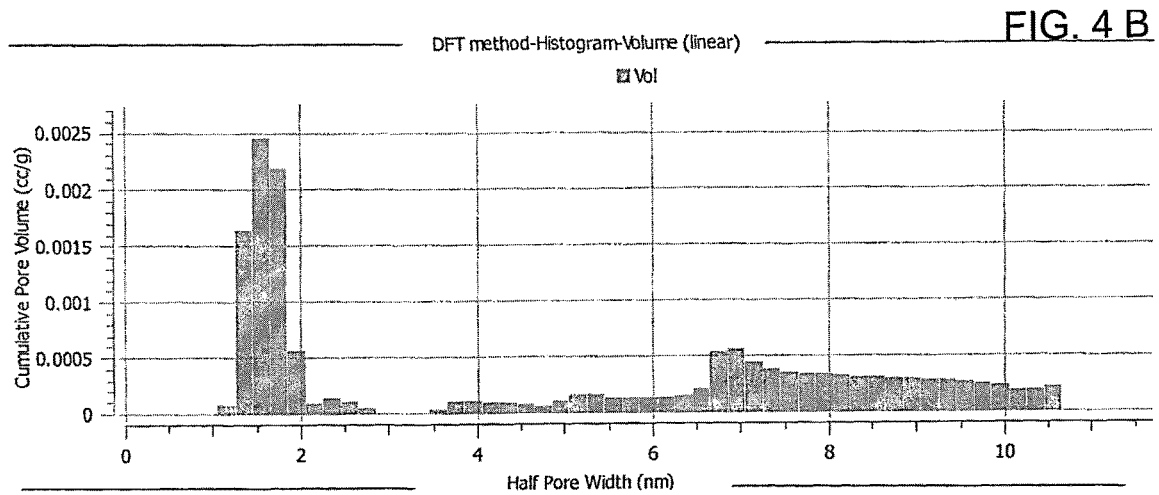

A 0.194 g sample of engineered carbon produced by the presently disclosed method was tested for surface area and half pore width using a NOVAtouch LX$^4$ gas sorption analyzer by Quantachrome Instruments, Inc. The details on the test conditions and results are presented in FIGS. 4A and 4B.

Surface area measured at 235.3852 m$^2$/g, with a pore volume of 0.1132 cc/g. The histogram of the half pore width showed one major concentration with population centered at around 1.75 nm, a second broader range of between about 3 to 5 nm, and a third group at between 6.5 to 10 nm.

Example 2

A 0.2584 g sample of engineered carbon produced by the presently disclosed method was tested for surface area and half pore width using a NOVAtouch LX$^4$ gas sorption analyzer made by Quantachrome Instruments, Inc. The details on the test conditions and results are presented in FIGS. 5A and 5B.

Surface area measured at 212.7494 m$^2$/g, with a pore volume of 0.0854 cc/g. The histogram of the half pore width showed one major concentration with population centered at around 1.5 nm, and a second broader range of between about 4 to 10 nm with a slight increase in population at between 6.5 to 9 nm.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

What I claim is:

1. A method of converting a biomass feedstock into engineered carbon comprising:
   providing a biomass feedstock having sizes and shapes within desired ranges;
   providing a holding canister and a sealable reactor vessel;
   placing the biomass feedstock into the holding canister;
   placing the holding canister into the sealable reactor vessel;
   sealing the sealable reactor vessel;
   purging the reactor vessel with air;
   utilizing a heater to ignite the biomass feedstock;
   thermally converting the biomass feedstock;
   adding a mixture of superheated steam and/or air;
   discontinuing the addition of the superheated steam when a flue gas temperature reaches a desired first temperature;
   increasing both temperature of the biomass feedstock and pressure in the reactor vessel to desired second levels;
   decreasing the pressure of the reactor vessel to a desired third level by adjusting the addition of compressed air;
   continuing the thermal conversion of the biomass feedstock until its temperature reaches a desired third level;
   contacting high temperature steam with the biomass feedstock;
   adding water into the reactor vessel sufficient to end the thermal conversion of the biomass feedstock, and
   recovering the engineered carbon from the reactor vessel.

2. The method according to claim 1, wherein the purging step is conducted in an updraft direction.

3. The method according to claim 1, wherein the addition of superheated steam and/or air is continued until the desired first temperature of greater than 200 C is reached, wherein the addition of superheated steam and air is conducted in a downdraft direction.

4. The method according to claim 1, wherein the mixture of superheated steam and compressed air removes moisture from the biomass feedstock and maintains a deprived oxygen state.

5. The method according to claim 1, wherein the desired second level temperature of the biomass feedstock is in a range of 200 to 750 C, and the desired second level pressure in the sealable reactor vessel is in a range of 4 to 150 psi.

6. The method according to claim 1, wherein the compressed air is regulated and the desired third level pressure of the reactor vessel decreases to a range of between 20 and 60 psi.

7. A method according to claim 1, wherein the addition of compressed air can be in an updraft or downdraft direction.

8. A method according to claim 1, wherein off gas from the thermal conversion of the biomass feedstock can be reverse flowed through the reactor vessel.

9. A method according to claim 1, wherein compressed air can be feed at a constant or variable rate.

10. A method according to claim 1, wherein the heater can be turned off after ignition of the biomass feedstock.

11. A method according to claim 1, wherein the desired sizes and shapes of the biomass feedstock comprises hardwood cut into pieces having minor dimensions ranging from 1 to 6 inches, in wedge shapes that are no greater than 6 inches in diameter, or as slab wood originating from logs with diameters ranging up to 12 inches, and in lengths ranging from 4 to 36 inches.

12. A method according to claim 1, wherein the desired sizes and shapes of the biomass feedstock comprises bamboo either in an original cylindrical shape, or cut lengthwise in half, and in lengths ranging from 4 to 36 inches.

* * * * *